United States Patent [19]
Dopp

[11] Patent Number: 4,617,242
[45] Date of Patent: Oct. 14, 1986

[54] ORGANIC SILICONATE ADDITIVE FOR ALKALINE ZINC ELECTROCHEMICAL CELLS

[75] Inventor: Robert B. Dopp, Madison, Wis.

[73] Assignee: Rayovac Corporation, Madison, Wis.

[21] Appl. No.: 721,136

[22] Filed: Apr. 8, 1985

Related U.S. Application Data

[63] Continuation of Ser. No. 543,429, Oct. 19, 1983, abandoned.

[51] Int. Cl.[4] .............................................. H01M 4/00
[52] U.S. Cl. ........................................ 429/27; 429/29; 429/40; 429/206; 429/229
[58] Field of Search ...................... 429/229, 27, 29, 40, 429/206

[56] References Cited

U.S. PATENT DOCUMENTS

| | | | |
|---|---|---|---|
| 2,942,050 | 6/1960 | Denes | 429/229 |
| 3,149,900 | 12/1968 | Elmore et al. | 136/86 |
| 3,276,909 | 10/1966 | Moos | 136/86 |
| 3,585,081 | 6/1971 | Mirmau | 429/206 |
| 3,650,836 | 3/1972 | Grubb et al. | 136/86 R |
| 3,682,707 | 8/1972 | Sandler | 136/86 E |
| 4,029,854 | 6/1977 | Welsh et al. | 429/27 |
| 4,076,899 | 2/1978 | Kring | 429/42 |
| 4,369,568 | 1/1983 | Dopp | 129/623.2 |

Primary Examiner—Charles F. LeFevour
Attorney, Agent, or Firm—Kenyon & Kenyon

[57] ABSTRACT

An electrochemical zinc/air cell which includes an organic siliconate, such as methyl siliconate, in contact with the zinc anode. The siliconate may be present as an additive to the electrolyte or a coating on the zinc anode or separator.

27 Claims, 5 Drawing Figures

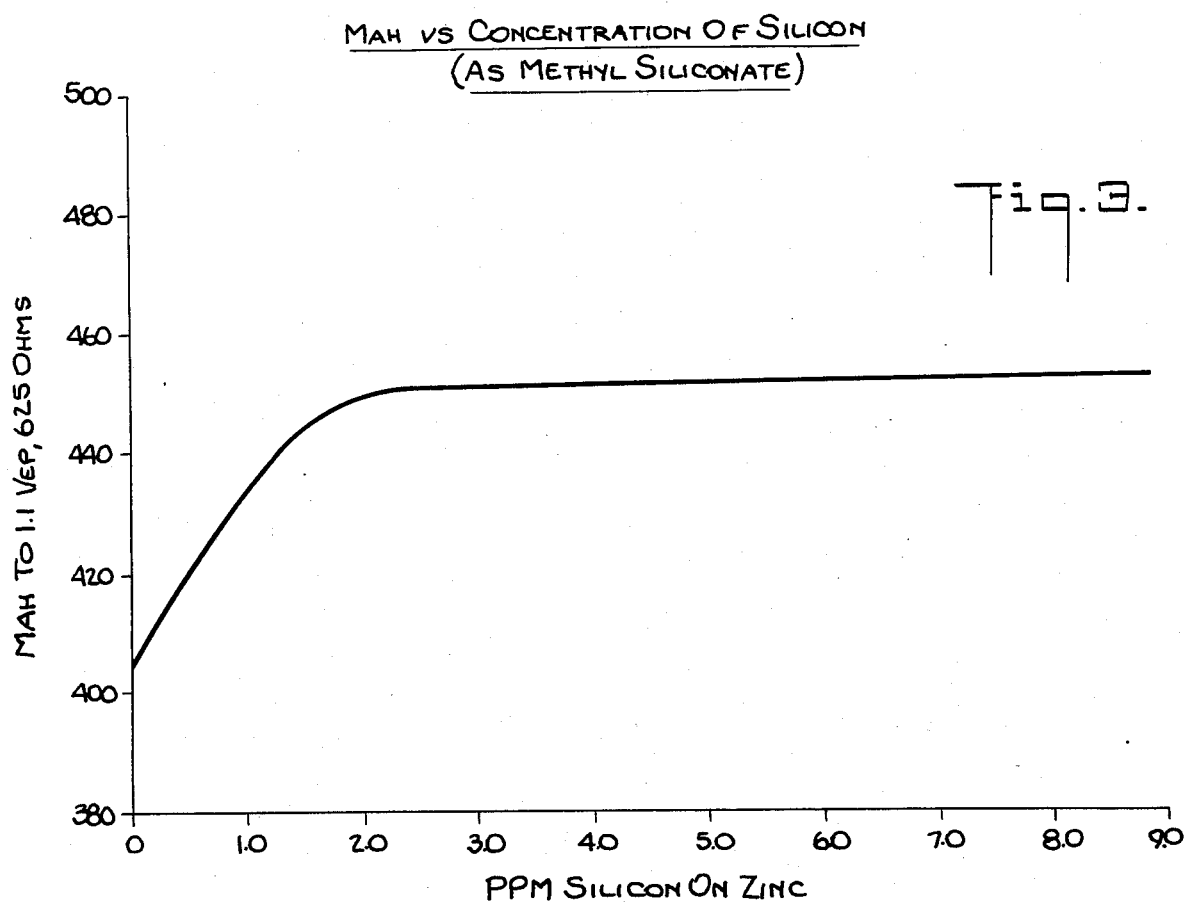
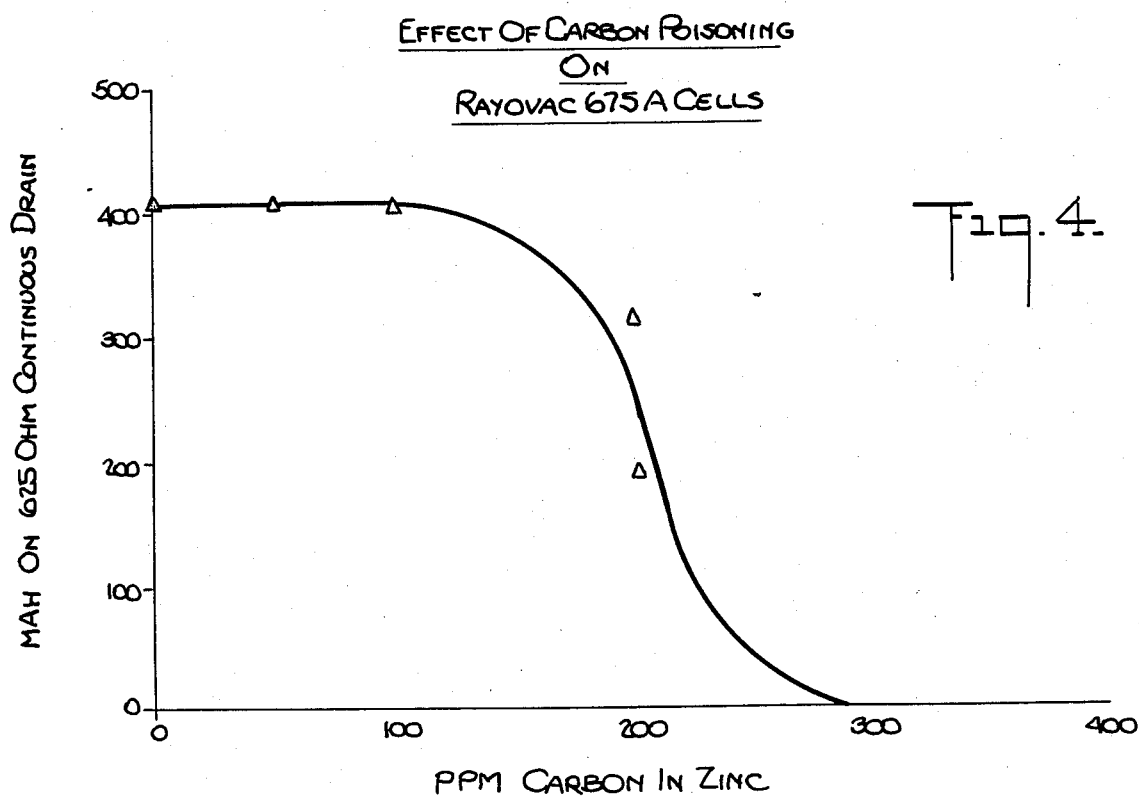

ORGANIC SILICONATE ADDITIVE FOR ALKALINE ZINC ELECTROCHEMICAL CELLS

This is a continuation of copending application Ser. No. 543,429 filed Oct. 19, 1983 abandoned.

FIELD OF INVENTION

This invention relates to alkaline zinc electrochemical cells, and more particularly to alkaline electrochemical cells having metallic zinc anodes and air cathodes, commonly known as zinc-air cells.

Zinc-air cells are electrochemical cells wherein the oxygen in the air acts as the cathode material and amalgamated zinc is the anode material. Air enters the electrochemical cell through ports on one side of the cell, is allowed to diffuse through a catalytic layer where the oxygen reacts with water to form hydroxide ions which react with metallic zinc in an alkaline environment to produce the electric energy.

BACKGROUND OF INVENTION

In zinc-air cells, air enters the cell through port(s) in the cell which are immediately adjacent to a cathode assembly. The air diffuses into an air cathode sub-assembly where the oxygen is reacted. This air cathode sub-assembly generally consists of mixtures of activating chemicals supported by a complex physical structure. The air cathode sub-assembly also slows the diffusion of other gases, particularly carbon dioxide and water vapor, through the electrode to the reaction site. Other gases in air, particularly water vapor, have a profound limiting effect on the capacity of the cell.

The activated oxygen diffuses through a separator, a moisture barrier usually of a plastic-like material impervious to liquids such as the alkaline electrolyte, and reacts with the water in the electrolyte consuming electrons and producing hydroxide ions. These ions then oxidize the metallic zinc, generally producing two electrons for each atom of zinc reacted. Such air cathode electrochemical cells are well known, and are more fully discussed in references such as U.S. Letters Pat. Nos. 3,149,900 (Elmore and Tanner) and 3,276,909 (Moos).

It is well known that the limit to the efficiency of zinc-air cells below the theoretical rate capacity is due to two different factors. Initially, the cell efficiency is limited by the cathode. The rate of mass transport of the oxygen into the cathode limits the reaction of the oxygen with water in the alkaline environment. The present invention, however, is not directed to electrochemical cell rate capacity limitations due to the cathode.

The present invention is directed to the reduction in cell efficiency which occurs after the zinc-air cell has been substantially discharged. This limitation in rate capacity is related to events occurring in the zinc anode during discharge. As zinc is oxidized, a zinc oxide layer forms on the surface of the metallic zinc. Zinc oxide is a known poor conductor of electricity. As the cell continues to discharge, the zinc oxide layer grows. As the zinc oxide layer grows, the internal conductivity and therefore the rate capacity decreases. The rate capacity is further limited by side reactions which compete with the main reaction for the metallic zinc. These side reactions consume zinc without producing any free electrons. A very rate limiting side reaction is:

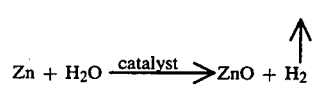

Water, the solvent of the electrolyte, is a readily available reactant. The production of the hydrogen gas quickly increases the internal pressure of the zinc-air cell, which can cause the seals of the cell to fail, resulting in a leakage of electrolyte. This rate limiting reaction appears to be catalyzed by carbon. Therefore, carbon, which is often present in the cathode assembly, must be isolated from the zinc reduction zones. The presence of carbon in the zinc anode assembly, even in trace amounts, greatly increases the rate of hydrogen gas formation.

The objective of the present invention is to extend the capacity of zinc-air button cell by lessening the effects of the rate limitations which originate in the zinc anode. This objective and other subsidiary objectives are achieved by the practice of the present invention.

SUMMARY OF INVENTION

The objective of the present invention is achieved by incorporating organic siliconate into the anode of zinc-air cells. More particularly, the objective of the present invention is achieved when the organic siliconate contains six or less carbon atoms in the organic groups. According to the present invention, the organic siliconate is introduced to the zinc anode as an additive to the electrolyte, as a coating on the metallic zinc, or as an additive or coating on the non-metallic barrier which contacts the electrolyte contained in the zinc anode. The amount of organic siliconate necessary to practice this invention ranges from trace amounts up to 50 ppm silicon (from organic siliconates) versus zinc weight. While the invention can be practiced with organic siliconates generally, the preferred organic siliconate is methyl siliconate.

The introduction of organic siliconates increases the capacity of zinc-air cells. While the mechanism is not fully understood, it is believed that the organic siliconates reduce the rate of formation of the crystalline structure of the zinc oxide layer on the surface of the metallic zinc by coating the surfaces of the amalgamated zinc. According to the proposed mechanism, the organic groups incorporated in the silicon compound give the zinc increased surface activity, while maintaining a high level of surface stability. Since the reaction rate is proportional to the number of reaction sites, the decreased formation of zinc oxide increases the number of reaction sites within the anode. The decreased formation of zinc oxide also reduces the internal charge resistance within the anode.

An unexpected result of this invention is the effect of organic siliconate on carbon, a heretobefore known poison of zinc anodes. The use of organic siliconate as disclosed by this invention stops the poisoning effect of carbon on zinc anodes, even when carbon is present in the zinc anode in amounts of up to 500 ppm versus zinc weight. In fact, the presence of carbon in zinc anodes, when organic siliconates are used according to the present invention, may actually increase the rate capability of zinc-air cells. This increase in the capacity probably stems from a reduction in charge resistance within the anode, since carbon is a known conductivity enhancer. The organic siliconates of the present invention appear to affect the ability of carbon to catalyze the reaction of zinc and water to zinc oxide and hydrogen gas without affecting the charge conductivity properties of carbon.

Since it is shown to extend the capacity of zinc-air cells, the present invention, i.e., the use of organic siliconates in the zinc anode, includes the use of carbon-laced zinc anodes in zinc-air button cells. The amount of carbon which can be added to the zinc anode according to the present invention varies up to 500 ppm versus zinc weight when the silicon (introduced as organic siliconate) contained in the button cell is increased to approximately 0.01% of the zinc by weight.

While the present invention relates to zinc-air cells generally and other zinc anode cells, it is particularly adapted to zinc-air button cells. The term button cells has been adopted for very small, disc-like electrochemical cells. Button cells, which are approximately the size of garment buttons, have diameters ranging up to about 25 mm and heights ranging up to about 15 mm. Button cells are used as power sources for a wide variety of devices, including watches, calculators, hearing aids, and many other electric devices requiring low power, long-lasting sources of energy.

The power generating electochemical reactions which take place in button cells, because of their minute dimensions, must be efficient and complete. To obtain the maximum cell efficiency, any button cell reactant which cannot be replaced (e.g., metallic zinc) must be completely consumed. Because of the limited size of button cells, and the corresponding limited amounts of reactants, very small changes in the amount of reactants, reaction poisons, catalysts, etc., will have profound effects on the capacity of button cells. Similarly, the generation of side products, albeit from incomplete "good" reactions or undesired reactions, will lead to a rapid increase in internal cell pressure. Therefore, the increases in cell efficiency resulting from applying the teachings of the present invention are magnified in button cells.

Zinc-air button cells are normally constructed in two steps; the anode section and the cathode section of zinc-air button cells are usually separately assembled and then joined together prior to the cell being permanently sealed.

Generally, the cathode section is contained in a topless, hollow metallic can with a small air entry hole in the can bottom. The air cathode sub-assembly, which is covered with a non-metallic separator, is slightly compressed within the cathode section.

The zinc anode section consists of a topless, hollow metallic can into which a measured amount of zinc is placed. An alkaline electrolyte is then metered directly onto the surface of the zinc.

After the electrodes have been made, they are joined by inverting the cathode section and placing it in the open end of the anode can. The button cell is then sealed, usually by crimping the edges into a non-metallic grommet.

BRIEF DESCRIPTION OF THE DRAWINGS

FIG. 3 is a graph illustrating the effect of silicon concentration on cell capacity.

FIG. 4 is a graph illustrating the effect of carbon poisoning on cells.

The disclosed benefits of the present invention were measured by comparative tests of standard, commercial RAYOVAC zinc-air button cells (rated capacity-400 milliampere hours) and zinc-air button cells in which methyl siliconate is an additive to the electrolyte, but otherwise identical to the standard commercial cells. The methyl siliconate-doped electrolyte used in the test cells was prepared as follows:

1. 1.42% by weight of DOW CORNING 193 (a silicon glycol copolymer surfactant, CTFA name: dimethicone copolyol) was added to the standard electrolyte (i.e., 30% KOH, 2% ZnO in water).
2. The mixture was stirred vigorously for twenty-four hours, then allowed to stand for one week.
3. The clear lower fluid (stock methyl siliconate doped electrolyte) was physically separated from the oily surface layer.
4. The desired amount of methyl siliconate (versus zinc weight) was introduced to the zinc anode by mixing together M parts stock methyl siliconate doped electrolyte and 100-M parts stock standard electrolyte where M=(ppm of silicon wanted)×(zinc wt./electrolyte wt.)/13.602.

TEST 1

Figure 1:
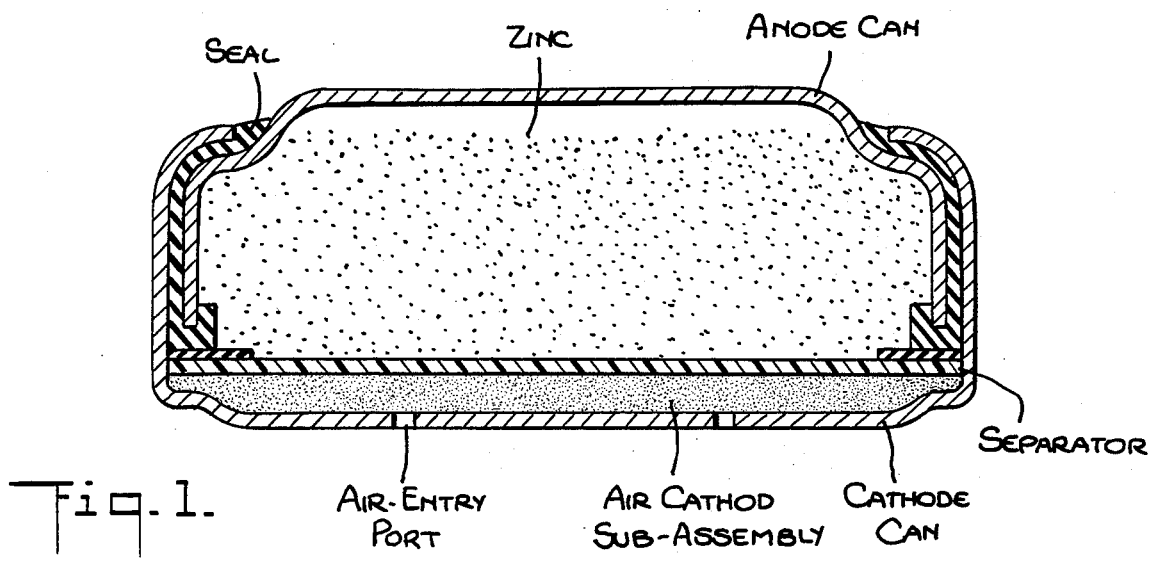
FIG. 1 shows the conventional zinc air button cell.
Figure 2:
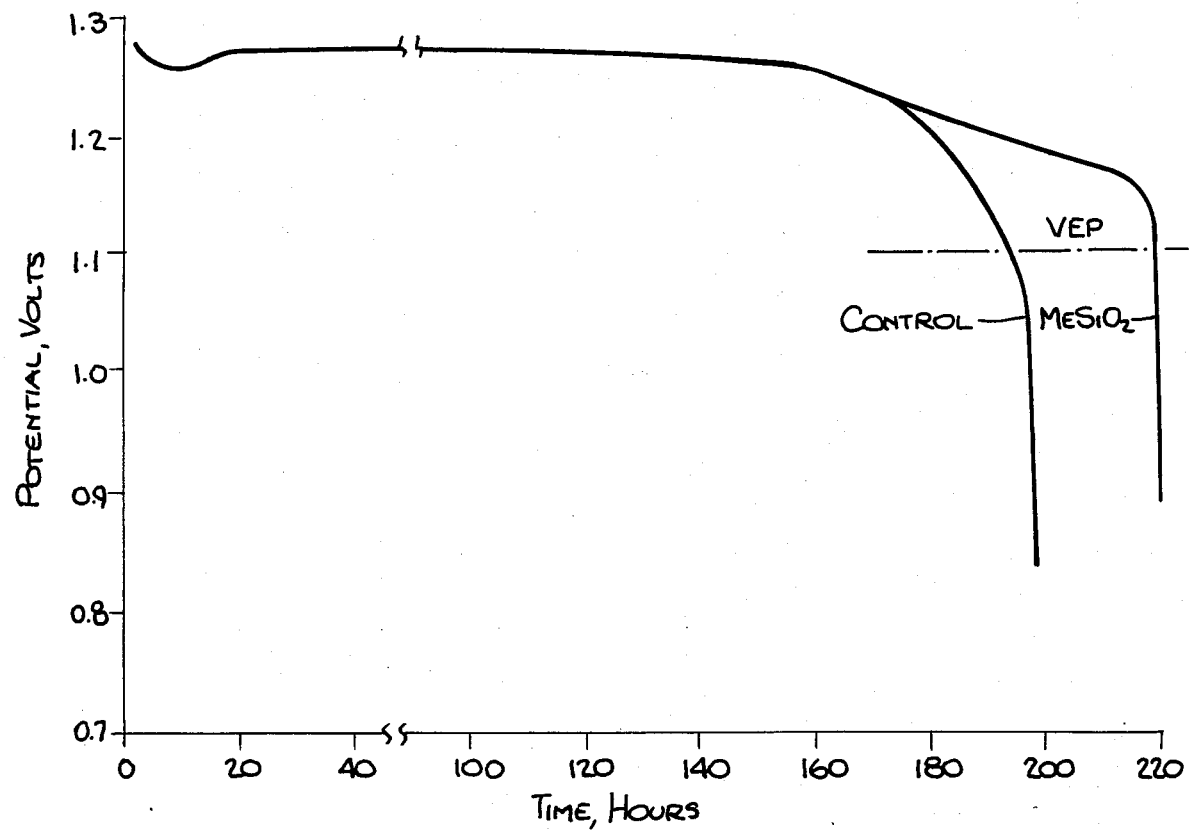
FIG. 2 is a graph illustrating the effect of methyl siliconate on cell discharge.

A cell containing 5 ppm silicon (introduced as methyl siliconate) versus zinc weight was constructed according to the present invention. To study the effect on discharge of the methyl siliconate, a 625 ohm load was applied to a control cell and the test cell containing 5 ppm silicon. The potential in volts as a function of time in hours was measured. As shown in FIG. 2, the discharge curves were identical for the first one hundred eighty hours. After that, the control cell more quickly reached the voltage end point (1.1 volts). Therefore, FIG. 2 shows that the increased efficiency of cells constructed according to this invention results in an increase in capacity attributable to increased zinc anode efficiency.

TEST 2

A series of cells were constructed according to the present invention with varying amounts of methyl siliconate incorporated therein as described by the above procedure. A 625 ohm load was applied to each cell and the capacity in milliampere hours, to the voltage end point (1.1 volts), was measured. It was found that as the amount of silicon in the cell, introduced as methyl siliconate, increased from 0 ppm up to approximately 2.0 ppm versus zinc weight, the increased concentration of silicon linearly increased the capacity of the zinc-air button cell. At concentrations above 2.0 ppm, there was no appreciable increase in capacity with increased silicon concentration versus zinc weight. FIG. 3 graphically presents the results of these tests.

The effects of carbon on zinc-air button cells was also measured. These tests confirmed that the present invention prevents carbon poisoning of zinc anodes.

TEST 3

Various amounts of activated carbon were added to the amalgamated zinc during the manufacture of the standard, commercial RAYOVAC zinc-air button cells of Test 1. There was no other deviation from the normal construction of the commercial cells. The cells were tested by applying a 625-ohm continuous drain and the capacity was measured as a function of ppm carbon in zinc. As FIG. 4 shows, there is no change in the capacity of the zinc-air button cell when less than about 100 ppm of carbon is added to the amalgamated zinc of the zinc anode. However, the presence of 200 ppm carbon in the zinc anode cuts the rate in half and when 300 ppm of carbon is added to the zinc-air button cell, the cell does not function at all. FIG. 4 conclusively shows the dramatic effect of carbon poisoning on zinc-air button cells.

TEST 4

Figure 5:
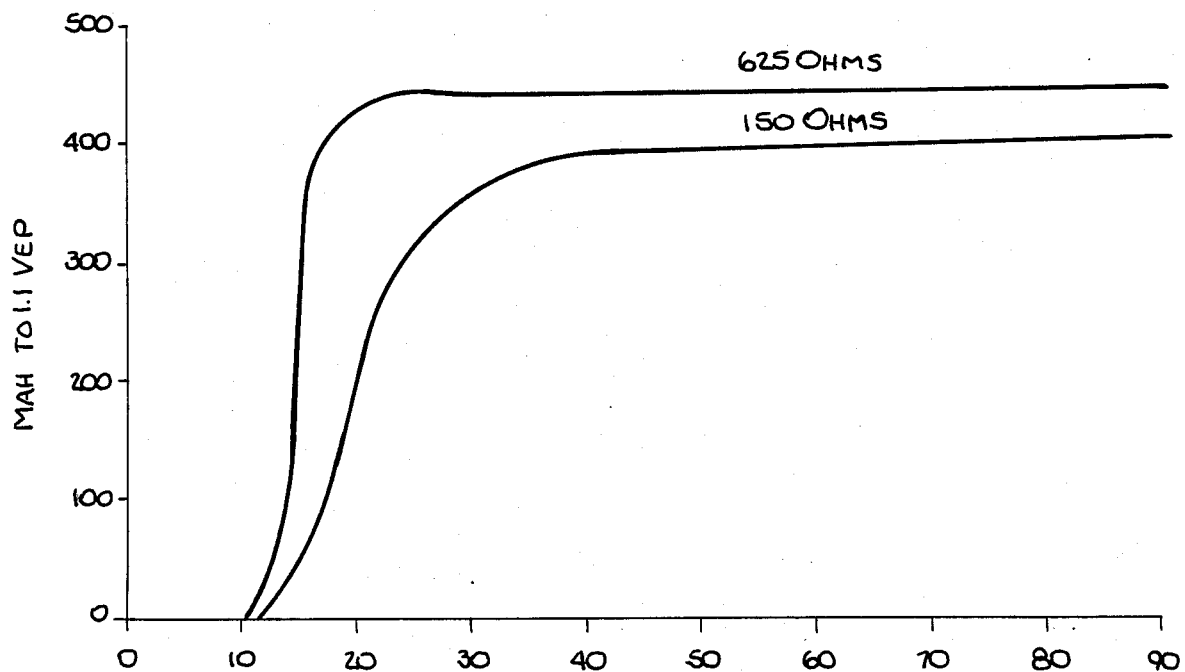
FIG. 5 is a graph illustrating the antidote action of methyl siliconate.

A series of cells were constructed according to the present invention with varying amounts of methyl siliconate therein added to the electrolyte, wherein 300 ppm carbon versus zinc weight had been mixed with amalgamated zinc. The capacity, in milliampere hours to the voltage end point was then measured under both 150 ohm and 625 ohm loads. FIG. 5 shows that methyl siliconate is an effective antidote for carbon poisoning in zinc air cells (where the zinc anode is laced with 300 ppm of carbon), when the amount of silicon from the methyl siliconate is at least 30 ppm versus zinc weight.

While the invention has been described in detail, I do not wish to be limited to the particular embodiment described. Particularly the teachings of my invention are applicable to all alkaline cells containing zinc anodes, including but not limited to zinc-mercury, zinc-silver and zinc-manganese dioxide alkaline cells. It is my intention to cover hereby novel adaptions, modifications and arrangements thereof which come within the practice of those skilled in the art to which the invention relates.

What is claimed is:

1. An alkaline electrochemical comprising an air cathode sub-assembly, with a means for supplying air to said cathode sub-assembly, a zinc anode an organic siliconate in contact with said anode, an electrolyte in contact with the zinc anode and a non-metallic separator between the cathode and the anode.

2. A sealed alkaline electrochemical button cell comprising:
   (a) a cathode can having air entry port in the bottom, containing an air cathode sub-assembly and a non-metallic separator and
   (b) an anode can containing an electrolyte and zinc anode with organic siliconate in contact with said anode
wherein the cathode can and the anode can are mated such that the non-metallic separator is between the air cathode sub-assembly and the anode.

3. An alkaline electrochemical cell as in claim 1 or 2, wherein the organic siliconate contains six or less carbon atoms in the organic groups.

4. An alkaline electrochemical cell as in claim 1 or 2, wherein the organic siliconate is methyl siliconate.

5. An alkaline electrochemical cell as in claim 1 or 2, wherein the amount of organic siliconate in said electrochemical cell ranges from trace amounts up to 50 ppm silicon versus zinc weight.

6. An alkaline electrochemical cell as in claim 1 or 2, wherein the organic siliconate is present in said cell as an additive to the electrolyte.

7. An alkaline electrochemical cell as in claim 1 or 2, wherein the organic siliconate is present in said cell as a coating on the zinc anode.

8. An alkaline electrochemical cell as in claim 1 or 2, wherein the separator is coated with an adhesive material.

9. An alkaline electrochemical cell as in claim 8, wherein the organic siliconate is present in said cell as an additive to the adhesive material coating the separator.

10. An alkaline electrochemical cell as in claim 1 or 2 wherein zinc anode comprises amalgamated zinc.

11. An alkaline electrochemical cell comprising an air cathode sub-assembly, with means for supplying air to said air cathode sub-assembly, a carbon-laced zinc anode having an organic siliconate in contact with said anode, an electrolyte in contact with the carbon-laced zinc anode and a non-metallic separator between the cathode and the anode.

12. A sealed alkaline electrochemical button cell comprising:
   (a) a cathode can having an air entry port in the bottom, containing an air cathode sub-assembly and a non-metallic separator and
   (b) an anode can containing an electrolyte and an carbon-laced zinc anode with organic siliconate in contact with said anode
wherein the cathode can and the anode can are mated such that the non-metallic separator is between the air cathode sub-assembly and the anode.

13. An alkaline electrochemical cell as in claim 11 or 12, wherein the organic siliconate contains six or less carbon atoms in the organic groups.

14. An alkaline electrochemical fuel cell as in claim 11 or 12, wherein the amount of carbon in the anode ranges up to 500 ppm versus zinc weight.

15. An alkaline electrochemical cell as in claim 11 or 12, wherein the amount of organic siliconate in said electrochemical cell ranges from 20 ppm to 100 ppm silicon versus zinc weight.

16. An alkaline electrochemical cell as in claim 11 or 12, wherein the organic siliconate is methyl siliconate.

17. An alkaline electrochemical cell as in claim 11 or 12, wherein the organic siliconate is present in said cell as an additive to the electrolyte.

18. An alkaline electrochemical cell as in claim 11 or 12, wherein the organic siliconate is present in said cell as a coating on the zinc anode.

19. An alkaline electrochemical cell as in claim 11 or 12, wherein the separator is coated with an adhesive material.

20. An alkaline electrochemical cell as in claim 19, wherein the organic siliconate is present in said cell as an additive to the adhesive material coating the separator.

21. An alkaline electrochemical cell as in claim 11 or 12 wherein the anode comprises amalgamated zinc laced with carbon.

22. An alkaline electrochemical cell comprising a zinc anode, and an air cathode, the improvement comprising the addition of organic siliconates containing six or less carbon atoms in the organic groups to the anode of the electrochemical cell.

23. An alkaline electrochemical cell comprising a zinc anode, an air cathode, an electrolyte electrically connecting said zinc anode and said cathode and an organic siliconate in contact with said zinc anode so that the rate capacity of said cell is increased.

24. The alkaline electrochemical cell of claim 1, 2, 11 or 23, wherein the electrolyte comprises:

a clear lower fluid fraction of a mixture of potassium hydroxide and zinc oxide including said organic siliconate which is a silicon glycol copolymer surfactant.

25. The alkaline electrochemical cell of claim 24 wherein:
the silicon glycol copolymer surfactant is dimethicone copolyol.

26. The alkaline electrochemical cell of claim 25 wherein the cathode is selected from the group consisting of mercury, silver and manganese dioxide.

27. The alkaline electrochemical cell of claim 25 wherein the anode is amalgamated zinc and includes activated carbon.

* * * * *

UNITED STATES PATENT AND TRADEMARK OFFICE
CERTIFICATE OF CORRECTION

PATENT NO. : 4,617,242
DATED : October 14, 1986
INVENTOR(S) : Robert B. Dopp

It is certified that error appears in the above—identified patent and that said Letters Patent is hereby corrected as shown below:

Col. 2, line 19, delete "cell" and insert --cells--.

Col. 5, line 36, after "electrochemical" insert --cell--.

Col. 5, line 38, after "anode" insert --having--.

Col. 6, line 9, after "wherein" insert --the--.

Col. 6, line 22, delete second occurrence of "an" and insert with --a--.

Signed and Sealed this

Fourteenth Day of April, 1987

Attest:

DONALD J. QUIGG

*Attesting Officer*   *Commissioner of Patents and Trademarks*